Nov. 8, 1927.
C. E. HOLMES
1,648,686
METER SEAL
Filed Dec. 1, 1926
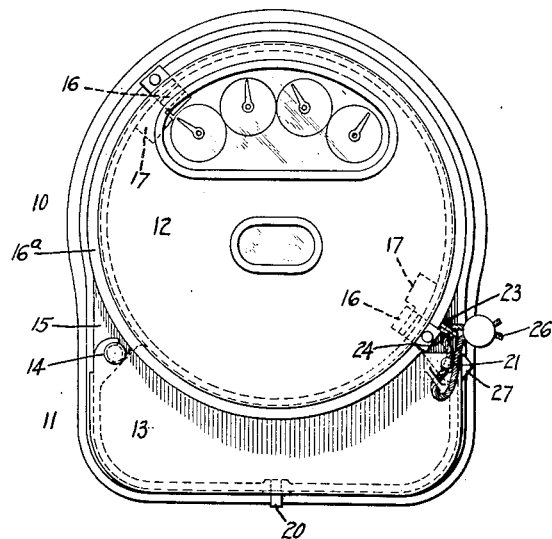
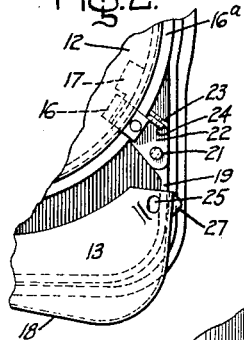 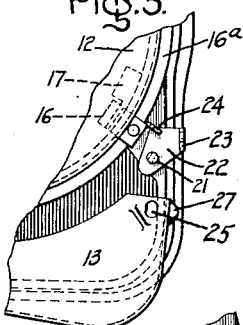 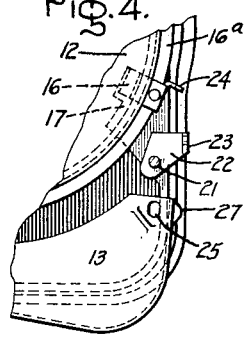
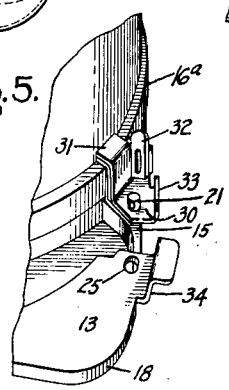 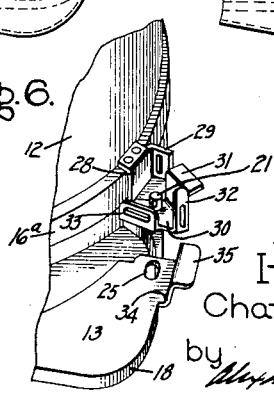
Inventor:
Charles E. Holmes,
by
His Attorney.

Patented Nov. 8, 1927.

1,648,686

UNITED STATES PATENT OFFICE.

CHARLES E. HOLMES, OF LYNN, MASSACHUSETTS, ASSIGNOR TO GENERAL ELECTRIC COMPANY, A CORPORATION OF NEW YORK.

METER SEAL.

Application filed December 1, 1926. Serial No. 152,024.

My invention relates to improvements in the sealing arrangement for the casings of electric meters.

The containing casing for ordinary house type electric meter is usually provided with a cover for the electric terminal chamber and a main cover for the meter itself. In the past it has been the practice to separately seal these covers, the main cover with seal pins and wing nuts and the cover for the terminal chamber by means of seal screws. These methods of sealing have certain disadvantages. For example, in sealing or unsealing the meter there are loose parts to handle such as nuts and screws which require time, and the parts being small are easily dropped and lost. The pressure of the wing nut on the main cover tends to distort the meter cover and occasionally causes breakage. It is also possible for unscrupulous persons to work a wire under the wing nut and through the seal pin holes in the main cover into contact with the rotating part of the meter and thus interfere with its operation for the purpose of "beating the meter" as it is called.

It is the object of my invention to provide a meter seal which is not subject to these faults. Another object of my invention is to provide a meter seal by means of which both covers may be properly secured by the same, or separate, seal wires, as desired. These objects are accomplished by my invention and at the same time the cost of manufacture of the meter casing is reduced.

The features of my invention which are believed to be novel and patentable will be pointed out in the claims appended hereto. For a better understanding of the invention, reference is made in the following description to the accompanying drawing in which Fig. 1 shows a plan view of an electric meter to which my invention has been applied with the covers sealed in place; Figs. 2, 3 and 4 show different unsealed positions of the parts of the meter of Fig. 1, and Figs. 5 and 6 show perspective views of another modification of the invention with the parts in different positions.

Fig. 1 shows a common house type electric meter provided with the usual compartments or chambers at 10 and 11 for containing the meter structure proper and the connecting terminals respectively. A circular cup-shaped cover 12 is provided for the main part of the meter and a separate cover 13 hinged at 14 is provided for the terminal compartment. These covers fit upon and are secured to a common base 15 comprising the front portion of the meter casing proper. The cover 12 is provided with a circular band or flange at 16$^a$ which fits over a circular raised portion of the base part 15 as in the usual meter of this type.

Secured to opposite diameters of the cover 12 are inwardly projecting clips indicated at 16. These clips extend slightly below the surface of the raised portion of the base plate when the cover is in place. L-shaped "bayonet" openings indicated at 17 are provided in the base plate through which the clips 16 are inserted in putting on the cover. Then when the cover is rotated slightly in a clockwise direction the clips pass under the adjacent portion of the base plate. The contacting surfaces of the clip and base portion are suitably inclined so that in rotating the cover to the position indicated in Fig. 1, the cover is drawn down tight against its seat, thus forming a usual bayonet fastening. This type of fastening is not essential to the invention and any other well known form of fastening might be used.

The cover 13 is cut at its upper edge to fit against the circular-shaped side portion of the cover 12 and at its lower edge and at its sides has its edges turned down as indicated at 18, Fig. 2, so as to overlap the forwardly projecting wall 19 of the terminal chamber 11 when in place. A pin 20, extending downward from the lower outside wall of the terminal chamber is provided to engage a corresponding opening in the turned down edge of cover 13 to assist in locking the cover in place as shown in Fig. 1.

Both covers are sealed at the right and the preferred means for doing this will now be described. Secured in the base frame of the meter and extending upwardly therefrom is a seal pin 21 provided with a hole through its upper end through which a seal wire may be passed. Pivotally secured to this seal pin is a locking member 22 having an upwardly bent clip 23 provided with an opening through which a seal wire or band may be passed. Extending from the circular cover 12 is a cooperating clip 24 having an opening through which a seal wire or band may be passed. When the cover 12 is in place and turned counter-clockwise as far as it will go, and member 22 is rotated to the left as far as it will go, clip 23 on the locking member 22 engages clip 24 on the cover and locks the cover from turning to a position where it may be removed. These positions of the parts are shown in Figs. 1 and 2. A seal wire may be passed through the aligned openings in lugs 23 and 24 to seal the main cover. The cover 13 of the terminal chamber has an opening 25 in its right-hand corner which is adapted to slip over the seal pin 21 when the cover is in place, and when the cover 13 is pressed down to its seat the opening in the lock pin comes just above the top surface of cover 13 so that a seal wire may be passed through the opening in the seal pin above cover 13 and seal this cover in place. When desired, both covers may be sealed by the same seal wire as represented in Fig. 1. Preferably a small strip of the cover 13 is pressed out adjacent the opening 25 to form an eye through which the seal wire is passed, as shown in Fig. 1, although this is not essential.

To unseal the meter of Fig. 1 we first remove the seal wire and raise cover 13 above seal pin 21 and rotate it clockwise about its pivot point at 14. The result of this operation is shown in Fig. 2. To remove the main cover the pivoted locking member 22 is rotated in a clockwise direction as shown in Fig. 3. Then the main cover may be rotated counter-clockwise so that the clips 16 on the cover disengage the bayonet openings 17, as indicated in Fig. 4, after which the cover 12 may be lifted off.

I prefer to arrange matters so that the pivoted locking member 22 cannot be moved to the unlocking position shown in Figs. 3 and 4 except when the cover 13 is disengaged, as shown in these figures, and so that the cover 13 cannot be sealed in place until the locking clip 23 is moved to the locking position shown in Figs. 1 and 2. These objects are accomplished in the embodiment described by reason of the fact that the turned down edge 18 of the cover 13 extends over and down the outside edge of clip 22 when the parts are in place and the right-hand surface of clip 22, as viewed in Fig. 2, is cut to fit snugly against the inner edge of 18 when the parts are in the sealing position. With this arrangement it is evident that member 22 can not be rotated into the position shown in Fig. 3 until cover 13 is disengaged and lowered. Neither is it possible to seal cover 13 in place until member 22 is rotated to its locking position. This reduces the possibility of the meter inspector leaving any part of the meter in an unsealed condition due to an oversight. In fact, if the parts are in place as shown in Fig. 1 the meter may be completely sealed by merely sealing the cover 13. The upper right-hand corner of the turned-down edge 18 may be bent outward slightly as shown at 27 to provide a handle for raising the cover 13 over the lock pin 21. This is desirable since with the cover 13 engaging the central locking pin at 20 the cover must be sprung slightly to slip it over the seal pin 21. Where the cover 12 is of glass it will be provided with a flanged metal band, as at 16ª, to which the fastening and seal clips are secured. When the cover is made of metal this band preferably becomes an integral part thereof.

Figs. 5 and 6 show a slightly different arrangement for accomplishing the same result. These figures are in perspective, whereas the other figures show plan views. However, the same style of covers are intended in all figures.

In Figs. 5 and 6 the main cover is provided with a lug 28, riveted, or otherwise secured, to the flange 16ª. This lug is provided with an outwardly extending seal clip 29 provided with an opening for accommodating the sealing wire or band. Pivoted to the seal pin 21 is a locking member 30 provided with three upwardly extending parts 31, 32 and 33. Part 31 is a clamping member which is adapted to engage the flanged portion of the main cover 12 and secure it on its seat when the member 30 is rotated in a counter-clockwise direction as far as it will go. This position is shown in Fig. 5. The opposite side of the meter cover, not shown, will be provided with a hinge or any other suitable fastening means which will permit the opening or removal of the cover when it is released by the clamp 31, as shown in Fig. 6. The part 32 is a sealing clip which fits against the clip 29 on the meter cover when the parts are in the clamping position shown in Fig. 5 and an opening in clip 32 is then aligned with the opening in clip 29 so that the sealing wire or band may be passed through these openings to seal the main cover.

The part 33 is another sealing clip provided with an opening, as shown in Fig. 6, which is adapted to cooperate with a corresponding sealing clip 34 on cover 13 when that cover is closed with the opening 25 engaging seal pin 21. When the meter covers are in place and ready to seal, the clip 34 comes inside the clip 33. An opening, not shown, in clip 34 is then aligned with the opening in clip 33 so that a sealing wire or band may be passed through these parts to seal the covers. When it is desired to seal the covers separately, a seal wire will preferably be passed through clips 33, 34 and the opening in seal pin 21. This completely seals the meter, but in addition the main cover may be sealed separately if desired, so that the unsealing of cover 13 does not necessarily unseal cover 12. It will be evident that the same advantages mentioned in connection with the modification previously explained are present here. It will also be evident that the cover 12, instead of being circular in shape, may be square or any other shape. The clip 34 is preferably provided with a turned-over portion 35 forming a handle to facilitate removal of cover 13.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is,—

1. A meter casing having a base portion provided with meter and terminal chambers, separate covers for said chambers, means on said base portion for locking the cover of the meter chamber in place, said means being movable to locking and unlocking positions, said locking means being so positioned as to prevent the proper closure of said terminal chamber by its cover except when said locking means is in its locking position.

2. A meter casing having a base portion provided with meter and terminal chambers, separate covers for said chambers, means on said base portion for locking the cover of the meter chamber, said means being movable to locking and unlocking positions, and means on the cover of said terminal chamber for securing said locking means in its locked position when said terminal chamber is closed.

3. A meter casing having a base portion provided with meter and terminal chambers, separate covers for said chambers, a seal pin secured in said base portion for fastening said terminal chamber cover in its closed position, and locking means for the cover of the meter chamber pivoted to said pin and arranged to prevent the closure of said terminal chamber cover except when said means is in locking position.

4. A meter casing having a base portion provided with meter and terminal chambers, covers for both chambers, a seal pin secured in said base portion for fastening said terminal chamber in its closed position, a seal clip on the cover of said meter chamber, a seal clip pivoted to said seal pin and adapted in one position to engage with the seal clip on said meter chamber cover and lock said cover in its closed position, said pivoted clip having a part which prevents the fastening of said terminal chamber cover except when said pivoted clip is in its locking position.

5. A meter casing having a base portion provided with meter and terminal chambers, a round cover for said meter chamber, bayonet fastening means for said cover adapted to secure said cover by a rotary movement of said cover on the base portion, a seal clip on said cover, a cooperating seal clip movably secured to said base portion and adapted to be moved into engagement with said first-mentioned clip when the cover is in its secured position to prevent the removal of said cover, a cover for said terminal chamber, a seal pin secured in said base portion adapted to engage an opening in said terminal chamber cover to secure it in closed position, said terminal chamber cover, when closed, engaging said movable seal clip to lock it in the above-named position.

6. A meter casing having a base portion provided with meter and terminal chambers, separate covers for said chambers and locking means for the cover of said meter chamber pivoted to said base portion and arranged to prevent the closure of said terminal chamber cover except when said means is in locking position.

7. A meter casing having a base portion provided with meter and terminal chambers, covers for both chambers, a seal clip on the cover of said meter chamber, a seal clip pivoted on said base portion and adapted in one position to engage with the seal clip on said meter chamber cover and lock said cover in its closed position, said pivoted clip having a part which prevents the cmplete closure of said terminal chamber cover except when said pivoted clip is in its locked position.

8. A meter casing having a base portion provided with meter and terminal chambers, a round cover for said meter chamber, bayonet fastening means for said cover adapted to secure said cover by a rotary movement of said cover on the base portion, a seal clip movably secured to said base portion and adapted to be moved into engagement with said first mentioned clip when the cover is in its secured position to prevent the removal of said cover, a cover for said terminal chamber having means for engaging said movable seal clip to lock it in the above named position when said terminal chamber cover is closed.

In witness whereof, I have hereunto set my hand this 29th day of November, 1926.

CHARLES E. HOLMES.